United States Patent
Ezaki

(10) Patent No.: US 10,624,117 B2
(45) Date of Patent: Apr. 14, 2020

(54) WIRELESS COMMUNICATION SYSTEM, BASE STATION, AND TERMINAL

(71) Applicant: FUJITSU LIMITED, Kawasaki-shi, Kanagawa (JP)

(72) Inventor: Takato Ezaki, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/995,453

(22) Filed: Jun. 1, 2018

(65) Prior Publication Data

US 2018/0279349 A1 Sep. 27, 2018

Related U.S. Application Data

(63) Continuation of application No. PCT/JP2015/084452, filed on Dec. 8, 2015.

(51) Int. Cl.
*H04W 72/12* (2009.01)
*H04W 4/70* (2018.01)
*H04L 5/00* (2006.01)
*H04W 48/18* (2009.01)
*H04W 72/06* (2009.01)
*H04W 28/02* (2009.01)

(52) U.S. Cl.
CPC ... *H04W 72/1284* (2013.01); *H04W 28/0278* (2013.01); *H04W 72/1252* (2013.01); *H04W 72/1268* (2013.01)

(58) Field of Classification Search
CPC ......... H04W 72/1284; H04W 28/0278; H04W 72/1252; H04W 72/1268
See application file for complete search history.

(56) References Cited

U.S. PATENT DOCUMENTS

| | | | |
|---|---|---|---|
| 2002/0191559 A1 | 12/2002 | Chen et al. | |
| 2005/0232135 A1* | 10/2005 | Mukai | H04L 5/0007 370/208 |
| 2005/0238041 A1* | 10/2005 | Hsu | H04W 48/18 370/441 |
| 2007/0281708 A1 | 12/2007 | Bakhuizen et al. | |
| 2010/0135166 A1 | 6/2010 | Ahluwalia | |
| 2010/0246538 A1* | 9/2010 | Kravtsov | H04W 72/06 370/336 |

(Continued)

FOREIGN PATENT DOCUMENTS

| | | |
|---|---|---|
| EP | 2 675 081 A1 | 12/2013 |
| JP | 9-214459 A | 8/1997 |

(Continued)

OTHER PUBLICATIONS

Ericsson, "Use cases in latency reduction", Agenda Item: 7.11, 3GPP TSG-RAN WG2 Meeting #90, R2-152451, Fukuoka, Japan, May 25-29, 2015.

(Continued)

*Primary Examiner* — Kiet Tang
(74) *Attorney, Agent, or Firm* — Myers Wolin, LLC

(57) ABSTRACT

A wireless communication system includes a terminal; and a base station configured to perform uplink scheduling. The terminal transmits to the base station, a signal that includes a scheduling request and a buffer state index value of the terminal. The base station performs scheduling for the terminal, based on the buffer state index value.

10 Claims, 20 Drawing Sheets

(56) References Cited

U.S. PATENT DOCUMENTS

| | | | |
|---|---|---|---|
| 2013/0182623 A1* | 7/2013 | Fan | H04W 4/70 370/311 |
| 2014/0023055 A1* | 1/2014 | Jeong | H04L 5/001 370/336 |
| 2014/0204800 A1 | 7/2014 | Moulsley | |
| 2015/0146677 A1 | 5/2015 | Ito | |
| 2016/0066362 A1 | 3/2016 | Ohta et al. | |
| 2017/0064734 A1 | 3/2017 | Tsuboi et al. | |

FOREIGN PATENT DOCUMENTS

| | | | |
|---|---|---|---|
| JP | 2001-024696 A | 1/2001 | |
| JP | 2002-374321 A | 12/2002 | |
| JP | 2008-520128 A | 6/2008 | |
| JP | 2012-110047 A | 6/2012 | |
| JP | 2015-211242 A | 11/2015 | |
| JP | 2015-220535 A | 12/2015 | |
| WO | 2008/085959 A1 | 7/2008 | |
| WO | 2009/025067 A1 | 2/2009 | |
| WO | 2013/166670 A1 | 11/2013 | |
| WO | 2014/181477 A1 | 11/2014 | |
| WO | 2014/184221 A1 | 11/2014 | |
| WO | 2015/137208 A1 | 9/2015 | |

OTHER PUBLICATIONS

Ericsson, "Latency reductions in LTE", Agenda Item: 7.11, 3GPP TSG-RAN WG2 Meeting #90, R2-152326, Fukuoka, Japan, May 25-29, 2015.

Intel Corporation, "Impact of latency reduction on TCP slow-start behavior", Agenda Item: 7.11, 3GPP TSG-RAN WG2 Meeting #90, R2-152174, Fukuoka, Japan, May 25-29, 2015.

Allman et al., "TCP Congestion Control", Network Working Group Request for Comments: 5681, Sep. 2009.

International Search Report issued for corresponding International Patent Application No. PCT/JP2015/084452, dated Feb. 2, 2016, with an English translation.

International Preliminary Report on Patentability issued for corresponding International Patent Application No. PCT/JP2015/084452, dated Feb. 2, 2016, with a partial English translation.

Notification of Reasons for Refusal issued by the Japan Patent Office for corresponding Japanese Patent Application No. 2017-554702, dated Nov. 27, 2018, with an English translation.

Notice of Reasons for Refusal issued by the Japan Patent Office for corresponding Japanese Patent Application No. 2017-554702, dated Apr. 23, 2019, with an English translation.

Institute for Information Industry (III), "Combined SR with BSR for reducing UP latency", Agenda Item: 7.10.1, 3GPP TSG-RAN WG2 Meeting #91bis, R2-154411 (Revision of R2-153416), Malmö, Sweden, Oct. 5-9, 2015.

Extended European search report with supplementary European search report and the European search opinion issued by the European Patent Office for corresponding European Patent Application No. 15910205.2, dated May 24, 2019.

* cited by examiner

FIG.3B

```
BufferStatusThresholdConfigIE ::=    SEQUENCE {                                    ⌐310
    bufferStatusThreshold0           ENUMERATED {size0, size1, ..., sizeN}
    bufferStatusThreshold1           ENUMERATED {size0, size1, ..., sizeN}
    bufferStatusThreshold2           ENUMERATED {size0, size1, ..., sizeN}
}
```

| SIZE INDEX | DATA SIZE OF $\theta_n$ |
|---|---|
| 0 | 16 Bytes |
| 1 | 32 Bytes |
| 2 | 64 Bytes |
| : | : |
| N-1 | 1000000 Bytes |

| BUFFER STATUS INDEX | I | Q |
|---|---|---|
| 0 | $1/\sqrt{2}$ | $1/\sqrt{2}$ |
| 1 | $1/\sqrt{2}$ | $-1/\sqrt{2}$ |
| 2 | $-1/\sqrt{2}$ | $1/\sqrt{2}$ |
| 3 | $-1/\sqrt{2}$ | $-1/\sqrt{2}$ |

FIG.10

| BUFFER STATUS INDEX | SCHEDULING DATA SIZE |
|---|---|
| 0 | $Sd_0$ |
| 1 | $Sd_1$ |
| 2 | $Sd_2$ |
| 3 | $\infty$ |

FIG.11

START

S1101: SELECT TERMINAL TO BE SCHEDULED

S1102: CALCULATE SCHEDULING METRIC

S1103: DETERMINE TERMINAL TO RECEIVE ALLOCATION

END

FIG.17

| BUFFER STATUS INDEX | RADIO RESOURCES OF SCHEDULING REQUEST |
|---|---|
| 0 | A |
| 1 | B |
| 2 | C |
| 3 | D |

WIRELESS COMMUNICATION SYSTEM, BASE STATION, AND TERMINAL

CROSS REFERENCE TO RELATED APPLICATIONS

This application is a continuation application of International Application PCT/JP2015/084452, filed on Dec. 8, 2015, and designating the U.S., the entire contents of which are incorporated herein by reference.

FIELD

The embodiments discussed herein relate to a wireless communication system, a base station, and a terminal.

BACKGROUND

To popularize real-time applications and improve TCP/IP efficiency responsible for almost all of the traffic, shortening of the delay time in the wireless communication section is required for next generation communication schemes (see, e.g., Ericsson, R2-152451, "Use cases in latency reduction", 3GPP TSG-RAN WG2 #90, RAN2#90, May 25-29, 2015; Ericsson, R2-152326, "Latency reductions in LTE", 3GPP RSG-RAN WG2 #90, RAN2#90, May 25-29, 2015; and Intel Corporation, R2-152174, "Impact of latency reduction on TCP slow-start behavior", 3GPP TSG-RAN WG2 Meeting #90, RAN2#90, May 25-29, 2015). Shortening the delay is effective for processing and execution of the real-time applications.

On the other hand, for improvements in the efficiency of TCP/IP, TCP has a control that uses a congestion avoidance algorithm called Slow start algorithm (see, e.g., M. Allman, et al, Network Working Group RFC 5681, "TCP Congestion Control" IETF, September 2009). It has been reported for this control that the TCP response time immediately after the communication connection may greatly influence the time taken for increases in data rate and, if the TCP response has a delay, the data rate may be prevented from increasing, impairing the efficiency of the entire network (see, e.g., Ericsson, R2-152326, "Latency reductions in LTE", 3GPP RSG-RAN WG2 #90, RAN2#90, May 25-29, 2015 and Intel Corporation, R2-152174, "Impact of latency reduction on TCP slow-start behavior", 3GPP TSG-RAN WG2 Meeting #90, RAN2#90, May 25-29, 2015).

An element greatly influencing the response time in the wireless section is, for example, an uplink response delay after generation of transmission data at a terminal until the terminal will be able to transmit data through completion of scheduling for the terminal by a base station.

Moreover, techniques have been disclosed of a terminal measuring traffic load and packet size of data to notify the base station and of a terminal notifying the base station of the data size by an identifier (see, e.g., Japanese Laid-Open Patent Publication No. H09-214459, Japanese Laid-Open Patent Publication No. 2002-374321, and Japanese Laid-Open Patent Publication No. 2001-24696).

SUMMARY

According to an aspect of an embodiment, a wireless communication system includes a terminal; and a base station configured to perform uplink scheduling. The terminal transmits to the base station, a signal that includes a scheduling request and a buffer state index value of the terminal. The base station performs scheduling for the terminal, based on the buffer state index value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3B is a diagram depicting exemplary notification contents of the buffer status threshold value according to the first embodiment;

FIG. 10 is a chart depicting a settings table related to data size determination in scheduling by the base station according to the first embodiment;

FIG. 11 is a flowchart depicting exemplary scheduling processing by a scheduling unit of the base station according to the first embodiment;

FIG. 17 is a chart depicting a setting example of scheduling request radio resources by the terminal according to a second embodiment;

DESCRIPTION OF THE INVENTION

First, problems associated with related arts will be described. In the existing techniques, the base station performs scheduling without taking into account the size of data transmitted from a terminal. Therefore, in the case of data that is small enough for the terminal to complete the communication through a single transmission, the terminal does not transmit data during the remainder of time allocated by the scheduling and thus, the remaining amount of the allocation is wasted.

Also in the case of a configuration where a terminal notifies a base station of the size of the remaining data to be transmitted, a predetermined time period (e.g., 20 msec) is required for the notification between the terminal and the base station. A base station, that has not received data transmission (uplink communication) from a terminal until immediately before, cannot know the size of data transmitted by the terminal. Accordingly, in order not to waste the radio resources, the base station cannot positively perform allocation of the radio resources until the base station receives notification of data size from the terminal. Thus, a response delay at the time of a scheduling request in the uplink communication cannot be eliminated.

Even in the case where a terminal can transmit all of the data by only a single data transmission, the base station cannot change the scheduling before receiving a notification of data size of 0 from the terminal, allowing the terminal to continue to send a data channel not transmitting data. This results in a meaningless consumption of finite radio resources and makes it difficult for the terminal to reduce its power consumption. Small-sized data (TCP ACK, etc.) as described above occurs very often as data transmitted from a terminal, but the above problems such as waste of the radio resources have not yet been solved.

Embodiments of a wireless communication system, a base station, a terminal, and a scheduling method of the disclosure will now be described in detail. The base station of the embodiment will be described using an example of wireless communication with a terminal in accordance with the wireless communication standard of long term evolution (LTE).

Figure 1:
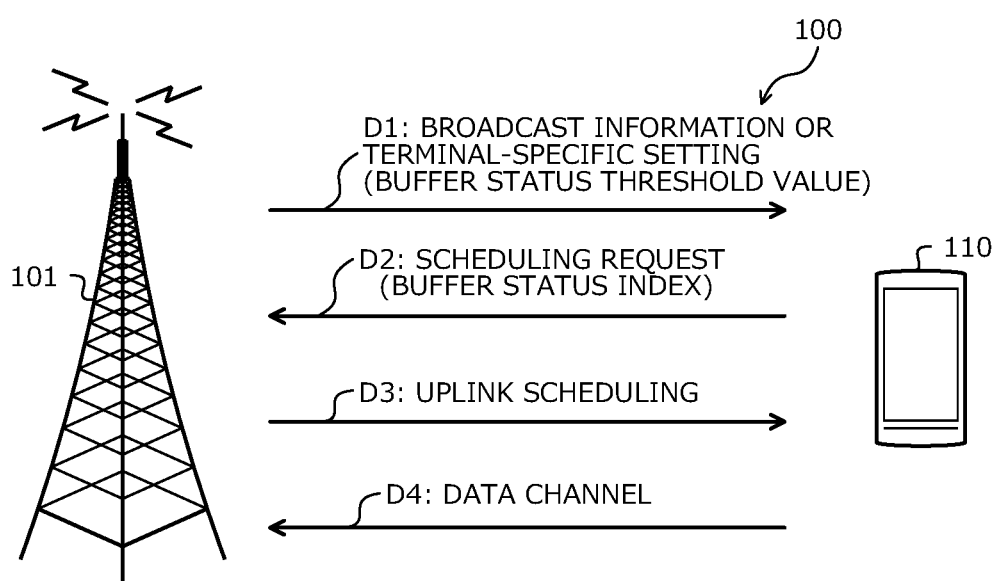
FIG. 1 is a diagram depicting an exemplary configuration of a wireless communication system according to a first embodiment.

FIG. 1 is a diagram depicting an exemplary configuration of a wireless communication system according to a first embodiment. A wireless communication system 100 includes a base station 101 and a terminal 110.

The base station 101 notifies the terminal 110, which in a cell thereof, of broadcast information or a parameter D1 related to wireless communication, as a setting specific to each terminal 110. If uplink data to be transmitted is present, the terminal 110 notifies the base station 101 of a scheduling request D2, to prompt a generation of an uplink communication (UL) scheduling (information) D3.

The terminal 110 then issues the scheduling request D2 including a signal related to the data size of data to be transmitted to the base station 101. For example, the terminal 110 may issue the scheduling request D2 including a signal indicative of a data size value of data to be transmitted to the base station 101. Alternatively, a value (a buffer status index) corresponding to the data size may be transmitted without transmission of the data size itself (details will be described later). This enables the base station 101 to know the data size to be transmitted by the terminal 110, based on the data size included in the scheduling request D2. The base station 101 then performs scheduling having a scheduling data size (e.g. the number of times of scheduling) suitable for the data size of the terminal 110. The terminal 110 then performs a data transmission D4 to the base station 101 using a data channel, based on the scheduling D3 received from the base station 101.

Figure 2:
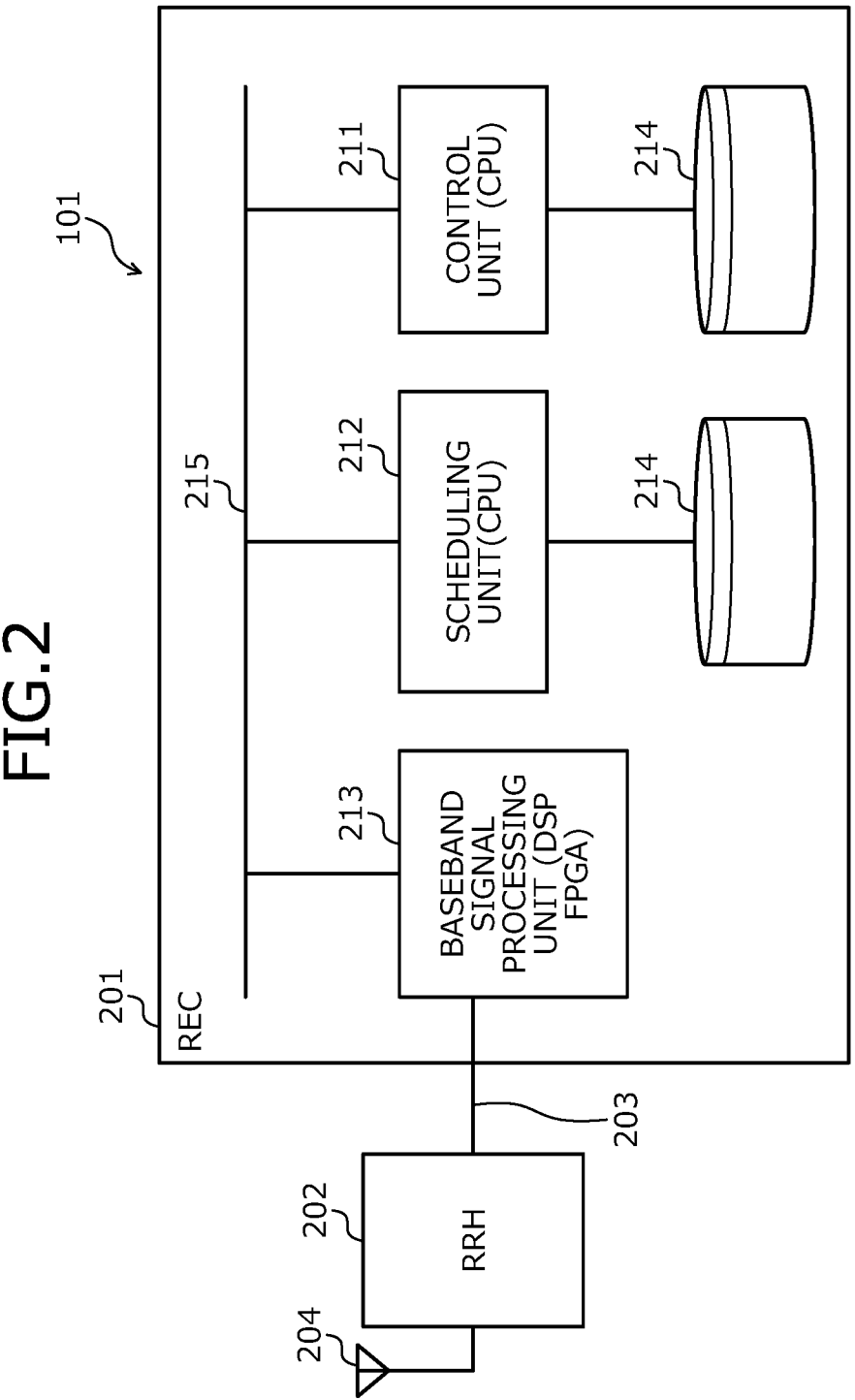
FIG. 2 is a diagram depicting an exemplary hardware configuration of a base station according to the first embodiment.

FIG. 2 is a diagram depicting an exemplary hardware configuration of the base station according to the first embodiment. The base station (eNB) 101 includes a radio equipment control (REC) 201 and a remote radio head (RRH) 202. The base station 101 includes a communication path 203 between the REC 201 and the RRH 202 and an antenna 204. The communication path 203 may be, for example, a common public radio interface (CPRI).

The REC 201 includes a control unit 211, a scheduling unit 212, a baseband signal processing unit 213, a storage unit 214, and a bus 215. The REC 201 is connected via a communication path (e.g. X2 interface or S1 interface) to an apparatus of a higher-level network of networks or to another base station 101 and transmits/receives data, etc. exchanged with the terminal, in accordance with a predetermined line protocol.

The control unit 211 oversees control of the entire REC 201. The control includes, for example, processing related to radio resource control (RRC) or to higher-layer control. The scheduling unit 212 performs radio resource allocation processing for the wireless communication with the terminal 110. The baseband signal processing unit 213 generates a baseband signal. The storage unit 214 is a memory that stores and retains various pieces of information for processing executed by the control unit 211 or the scheduling unit 212.

The control unit 211 and the scheduling unit 212 may be configured using, for example, individual CPUs or a single CPU. The CPU reads and executes a processing program stored in the storage unit 214 and retains processing data in the storage unit 214 during execution and thereby, implements functions of the control unit 211 and the scheduling unit 212. The storage unit 214 may be disposed separately for the control unit 211 and the scheduling unit 212. The baseband signal processing unit 213 may be a digital signal processor (DSP) or a field-programmable gate array (FPGA).

The RRH 202 transmits/receives data via the antenna 204 to/from a terminal by wireless communication at a predetermined frequency (radio frequency (RF)). The RRH 202 inputs/outputs wireless communication data via the communication path 203 from/to the REC 201 (baseband signal processing unit 213).

Utilizing the broadcast information (parameter D1 related to wireless communication), the base station 101 notifies the terminal 110 of information related to a buffer status threshold value. The buffer status threshold value is used when the terminal 110 converts the transmission data size (amount of data stored in a transmission buffer of the terminal 110) into an index value (buffer status index) of a predetermined length. The transmission data size is the amount of data stored in the transmission buffer and, in other words, is the size of data for which uplink radio resources have not yet been allocated.

For example, the terminal 110 notifies the base station 101 of the buffer status index in the form of, for example, a 2-bit (0 to 3) index value. In other words, the terminal 110 converts the buffer status into an index to notify the base station thereof. The base station 101 determines the data size that is actually to be transmitted from the terminal 110, based on the index value notified from the terminal 110, by referring to predetermined correspondence information (settings table) for example.

Here, the buffer status threshold value may not necessarily be notified from the base station 101 to the terminal 110. The buffer status threshold value may be preset in the terminal 110 or may be set in the terminal through periodic downloads, etc. The buffer status threshold value is held in a memory (storage unit 505 described later), etc. by the terminal 110 to enable updating.

Figure 3A:
FIG. 3A is a chart depicting a setting example of a buffer status threshold value according to the first embodiment.

FIG. 3A is a chart depicting a setting example of the buffer status threshold value according to the first embodiment. The chart depicts an example of the correspondence relationship between a buffer status threshold value θn (n: 0 to 3) and the transmission data size D occurring at the terminal 110. In the example of FIG. 3A, the transmission data size D is classified into 4 levels (buffer status indexes 0 to 3) within a range of 0 to D. The terminal 110 notifies the base station 101 of the buffer status index (0 to 3) corresponding to the transmission data size D. For example, a physical uplink control channel (PUCCH) format 1 signal may be used. The base station 101 may determine the transmission data size D, based on the buffer status index (0 to 3) notified from the terminal 110. For example, by using the correspondence information (settings table) as depicted in FIG. 3A, if the buffer status index is "1", it may be determined that the transmission data size D of the terminal lie within a range of "$\theta_0 \le D < \theta_1$".

A buffer status threshold value 300 is set into the control unit 211 as a parameter of each cell and is notified as part of a system information block (SIB), for example, to the terminals 110 in the entire cell covered by the base station 101.

FIG. 3B is a diagram depicting exemplary notification contents of the buffer status threshold value according to the first embodiment. In the notification by the broadcast information (parameter D1 related to the wireless communication), notification may be sent as an RRC message 310, for example, to the terminal 110. When receiving a message of the RRC message 310, the terminal 110 sets, as buffer status threshold values 0, 1, and 2, data size values notified as BufferStatusThreshold0,1,2. For the notification of the data size value in the RRC message 310, a representative value of the data size value is defined in advance and the terminal 101 is notified of the number (size index) corresponding to the representative value so that notification of the threshold value may be given using a small number of bits.

Figures 4, 5:
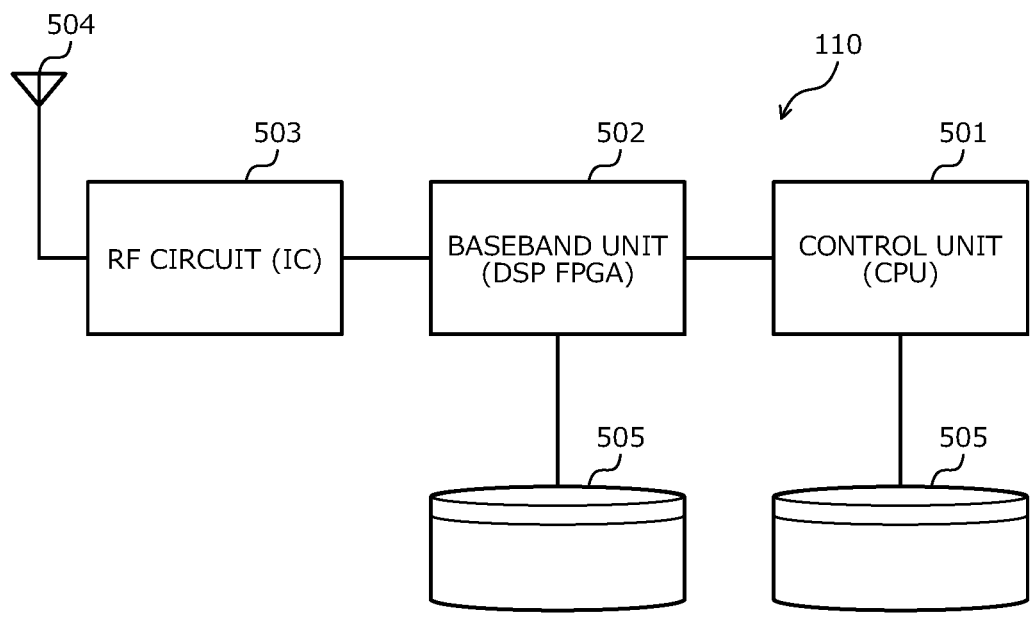
FIG. 4 is a chart depicting another setting example of the buffer status threshold value according to the first embodiment.
FIG. 5 is a diagram depicting a hardware configuration example of a terminal according to the first embodiment.

FIG. 4 is a chart depicting another setting example of the buffer status threshold value according to the first embodiment. As depicted in FIG. 4, the terminal 110 prepares in advance a settings table 400 of threshold value θn data sizes corresponding to index values of the size index and determines the threshold value that corresponds to the index value informed by the base station 101, by referring to the settings table 400.

Alternatively, regarding the buffer status threshold value, without the base station 101 notifying the terminal 110 by using the broadcast information (parameter D1 related to the wireless communication), the base station 101 may notify each individual terminal 110, for each communication connection. For example, when the terminal 110 connects to the base station 101, parameter setting such as RRC Connection Reconfiguration is notified, including threshold values (such as buffer status threshold value 300). This enables a specific threshold value to be set in communication contents (according to data communication and voice communication) of each terminal 110.

FIG. 5 is a diagram depicting a hardware configuration example of the terminal according to the first embodiment. The terminal 110, which wirelessly communicates with the base station 101, is for example a cellular phone such as smartphone or an information processing device having a wireless communication function.

The terminal 110 includes a control unit 501, a baseband unit 502, an RF circuit 503, an antenna 504, and a storage unit 505.

The control unit 501 oversees control of the entire terminal 110. The control includes for example processing related to the RRC or to higher-layer control. The baseband unit 502 generates a baseband signal. Via the antenna 504, the RF circuit 503 transmits/receives data to/from the base station 101 by wireless communication at a predetermined frequency (RF). The RF circuit 503 inputs/outputs wireless communication data from/to the baseband unit 502.

The control unit 501 may be configured using a CPU, for example. The CPU reads and executes a processing program stored in the storage unit 505 and retains processing data in the storage unit 505 during execution and thereby, implements a function of the control unit. The baseband unit 502 may be configured by a DSP or FPGA for example. The storage unit 505 may be disposed separately for the control unit 501 and the baseband unit 502.

Figure 6:
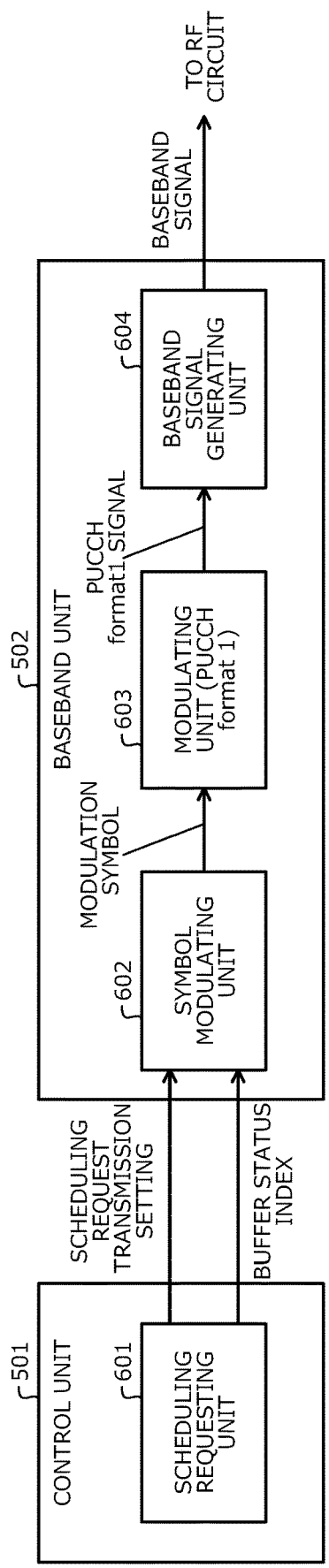
FIG. 6 is a block diagram depicting an example of a functional configuration of the terminal according to the first embodiment.

FIG. 6 is a block diagram depicting an example of a functional configuration of the terminal according to the first embodiment. Internal configurations of the control unit 501 and the baseband unit 502 of the terminal 110 depicted in FIG. 5 will be described.

The control unit 501 includes a scheduling requesting unit 601 that makes a scheduling request to the base station 101. The baseband unit 502 includes a symbol modulating unit 602, a modulating unit 603, and a baseband signal generating unit 604.

The scheduling requesting unit 601 notifies the symbol modulating unit 602 of not only a scheduling request transmission setting but also of buffer status indexes (0 to 3) corresponding to the size (transmission data size D) of transmission buffers upon data transmission from the terminal 110 to the base station 101.

When receiving the scheduling request transmission setting, the symbol modulating unit 602 carries out symbol modulation for the scheduling request based on the buffer status indexes.

Figures 7, 8:
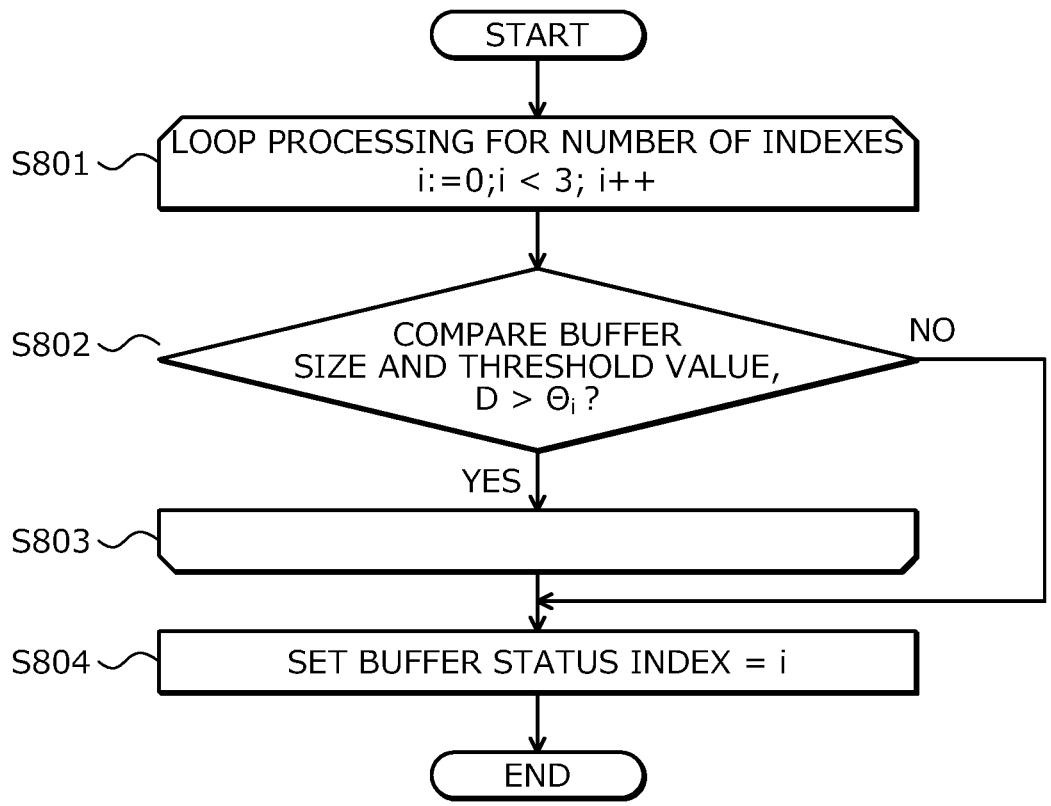
FIG. 7 is a chart depicting an example of symbol modulation at the terminal according to the first embodiment.
FIG. 8 is a flowchart depicting a processing example of buffer status index determination by the terminal according to the first embodiment.

FIG. 7 is a chart depicting an example of the symbol modulation at the terminal according to the first embodiment. Depicted is an example of quadrature phase shift keying (QPSK) modulation points corresponding to values of the buffer status indexes, carried out by the symbol modulating unit 602. For example, the symbol modulating unit 602 outputs a modulation symbol in the form of a combination of four different IQ coordinates corresponding to the buffer status indexes (0 to 3) defined in FIG. 7. For example, when the buffer status index is 0, a modulation symbol of $I=1/\sqrt{2}$, $Q=1/\sqrt{2}$ is output, and when the buffer status index is 2, a modulation symbol of $I=-1/\sqrt{2}$, $Q=1/\sqrt{2}$ is output.

As depicted in FIG. 6, the modulation symbol output from the symbol modulating unit 602 is modulated into a PUCCH format 1 signal by the modulating unit 603. The baseband signal generating unit 604 converts the modulation output into a time-domain signal by inverse fast Fourier transform (IFFT), imparts cyclic prefix (CP) thereto, etc. This modulation output is provided to the RF circuit 503 and then is transmitted via the antenna 504 to the base station 101.

FIG. 8 is a flowchart depicting a processing example of buffer status index determination by the terminal according to the first embodiment. If data to be transmitted to the base station 101 occurs in the uplink communication within the terminal 110, the terminal 110 transmits the scheduling request D2 to the base station 101. For example, under LTE, control channels called Scheduling Request are prepared for the uplink communication so that the scheduling request D2 is transmitted to the base station 101 using a proper control channel.

Upon the transmission of this scheduling request D2, the control unit 501 (scheduling requesting unit 601) compares the buffer status threshold value 300 notified in advance from the base station 101 with the transmission data size D, and acquires the buffer status indexes (0-3).

In the processing example of FIG. 8, the scheduling requesting unit 601 starts loop processing for the number of indexes (i=0 to 3) (step S801). The scheduling requesting unit 601 then refers to the buffer status threshold value 300 to compare the current buffer size (transmission data size D) of the transmission buffer holding data to be transmitted with threshold values θi of the buffer status threshold value 300 (step S802). If the transmission data size D is smaller than the size of any threshold value θi (less than $\theta_0$, step S802: NO), the procedure goes to step S804.

The transmission data size D is compared with the threshold values $\theta_0$, $\theta_1$, and $\theta_2$ in ascending order of size and, if it falls within the range of any size (step S802: YES), the scheduling requesting unit 601 terminates the loop processing (step S803) and shifts to step S804.

At step S804, the scheduling requesting unit 601 sets, as a comparison result, the buffer status index i (0 to 3) corresponding to the transmission data size D (step S804), and terminates the above processing.

Figure 9:
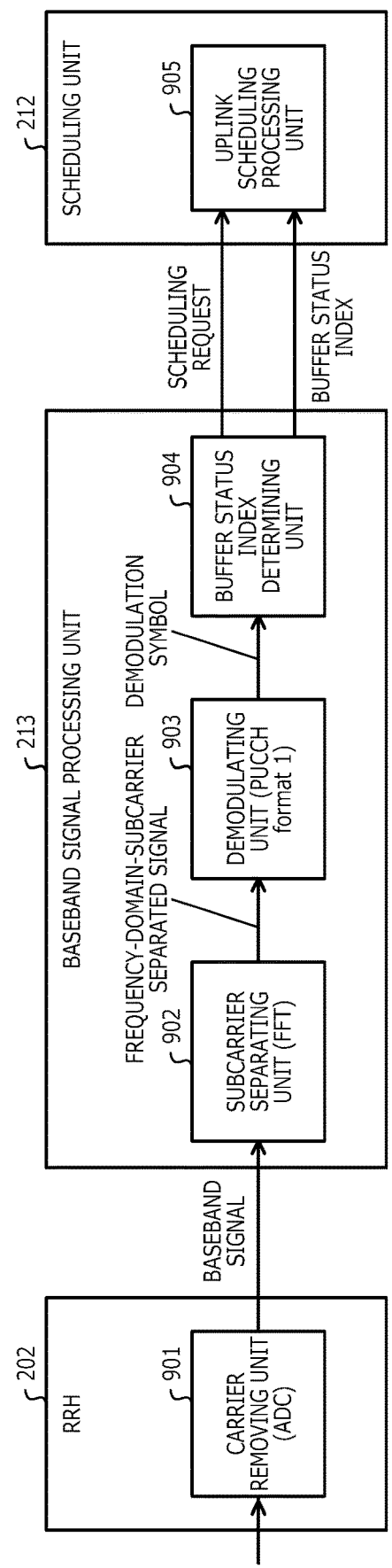
FIG. 9 is a block diagram depicting an example of a functional configuration of the base station according to the first embodiment.

FIG. 9 is a block diagram depicting an example of a functional configuration of the base station according to the first embodiment. As for the internal configurations of the RRH 202, scheduling unit 212, and baseband signal processing unit 213 of the base station 101 depicted in FIG. 2, a configuration of receiving the scheduling request transmitted from the terminal 110 will primarily be described.

The RRH 202 of the base station 101 includes a carrier removing unit 901. The baseband signal processing unit 213 includes a subcarrier separating unit 902, a demodulating unit 903, and a buffer status index determining unit 904. The scheduling unit 212 includes an uplink scheduling processing unit 905.

A scheduling request transmitted from the terminal 110 is subjected by the carrier removing unit 901 in the form of an AD converter (ADC) to carrier removal and is output as a baseband signal to the baseband signal processing unit 213.

The subcarrier separating unit 902 of the baseband signal processing unit 213 applies FFT signal processing to the baseband signal and acquires (separates frequency-domain subcarriers) reception signals of subcarriers within the reception frequency band and outputs a frequency-domain-subcarrier separated signal. The demodulating unit 903 performs PUCCH format 1-based demodulation of the received scheduling request and outputs a demodulation symbol. The buffer status index determining unit 904 restores the baseband status index transmitted from the terminal 110, based on the output demodulation symbol. The restored buffer status index together with the scheduling request is notified to the scheduling unit 212 (uplink scheduling processing unit 905).

The scheduling unit 212 (uplink scheduling processing unit 905) carries out uplink communication scheduling for the terminal 110 that has transmitted the received scheduling request. At this time, the scheduling unit 212 decides what amount of (remaining) transmission data the terminal 110 to be scheduled has, based on the buffer status index received from the corresponding terminal.

FIG. 10 is a chart depicting a settings table related to the data size determination in scheduling by the base station according to the first embodiment. For the buffer status index received from the terminal 110, the scheduling unit 212 sets the maximum value of the buffer sizes represented by the buffer status indexes, for example, as the scheduling data size Sd (Sd1, Sd2, . . . , ∞) in scheduling for the corresponding terminal 110. The relationship between the buffer status index and the scheduling data size in this case is depicted in FIG. 10.

FIG. 11 is a flowchart depicting exemplary scheduling processing by the scheduling unit of the base station according to the first embodiment. The scheduling unit 212 first selects the terminal 110 holding data to be transmitted to the base station 101 as a terminal 110 to be scheduled (step S1101).

Next, for the terminal 110 to be scheduled, the scheduling unit 212 calculates a scheduling metric indicative of the scheduling priority (step S1102). Finally, the scheduling unit 212 determines based on the calculated scheduling metric, a terminal 110 that is to receive a scheduling allocation (step S1103).

Figure 12:
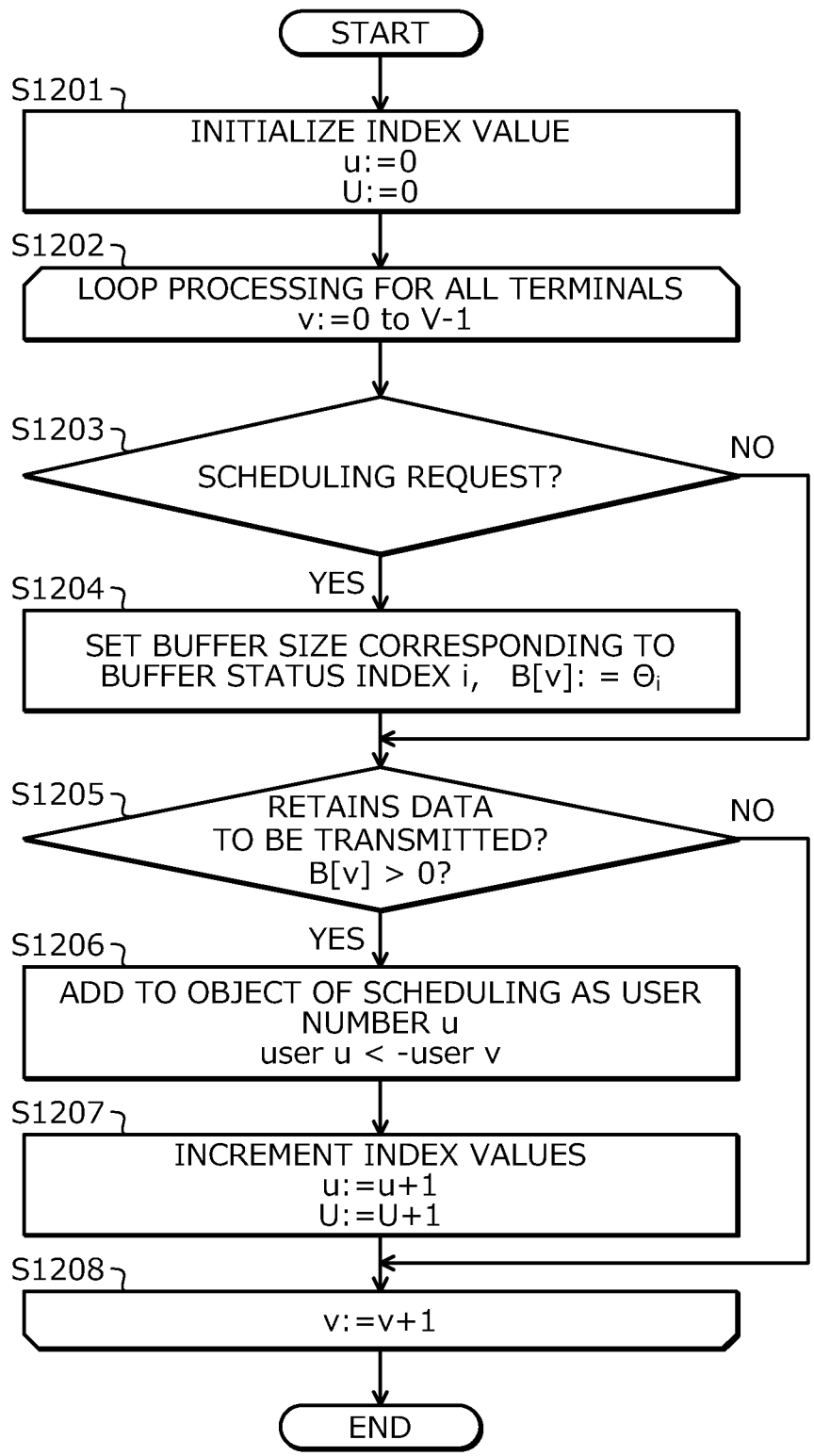
FIG. 12 is a flowchart (part 1) depicting details of scheduling processing according to the first embodiment.

FIG. 12 is a flowchart depicting details of scheduling processing according to the first embodiment. FIG. 12 depicts an example of processing of selecting a terminal 110 to be scheduled by the scheduling unit 212, depicted at step S1101 of FIG. 11.

The scheduling unit 212 searches among all terminals 110 within a communication range (cell), for a terminal 110 notified of a scheduling request from the baseband signal processing unit 213. The scheduling unit 212 then sets the buffer size for the terminal 110, based on the buffer status index.

In the processing example of FIG. 12, the scheduling unit 212 first initializes the index value (step S1201). An index value u (index of a terminal to be scheduled) and an index value U (the number of terminals to be scheduled) are both set to an initial value 0. The scheduling unit 212 then starts loop processing for searching all the terminals 110 within the communication range (cell) (step S1202). In this loop processing, operations at steps S1203 to S1207 are repeatedly performed until the search of all the terminals 110 within communication range (cell) is completed. In FIG. 12, a variable v is a variable indicative of indexes of all terminals (including terminals other than the terminals to be scheduled) within the communication range (cell), and a value V is the number of all terminals within the communication range.

At step S1203, the scheduling unit 212 determines whether a scheduling request from a terminal 110 being processed is present. If a scheduling request from the terminal 110 is present (step S1203: YES), step S1204 is executed. At step S1204, the scheduling unit 212 sets, as a buffer size B[v] at the time of scheduling, a buffer size θi corresponding to a buffer status index i notified from the terminal 110 (step S1204). If the terminal 110 has not issued a scheduling request (step S1203: NO), the procedure shifts to step S1205. The buffer size B[v] is a variable for storing the buffer size at a v-th terminal to be scheduled indicated by an index value v in the loop processing at steps S1202 to S1208.

At step S1205, the scheduling unit 212 determines whether the terminal 110 being processed retains data to be transmitted to the base station 101. If the terminal 110 retains data to be transmitted, B[v]>0 results (step S1205: YES), allowing the scheduling unit 212 to perform processing at step S1206 and subsequent steps. If the terminal v does not hold data to be transmitted to the base station 101 (step S1205: NO), B[v]=0 results (step S1205: NO) and the procedure shifts to step S1208.

At step S1206, a terminal having data to be transmitted is given a user number u and is added to object of scheduling (step S1206). By the addition of the terminal 110, index values (u, U) are incremented (step S1207). Then, to search all terminals 110 within the communication range (cell), v is incremented (step S1208) to continue processing at step S1203 to S1207. When v>V−1 at step S1202, search of all the terminals is completed, ending the processing depicted in FIG. 12.

Figure 13:
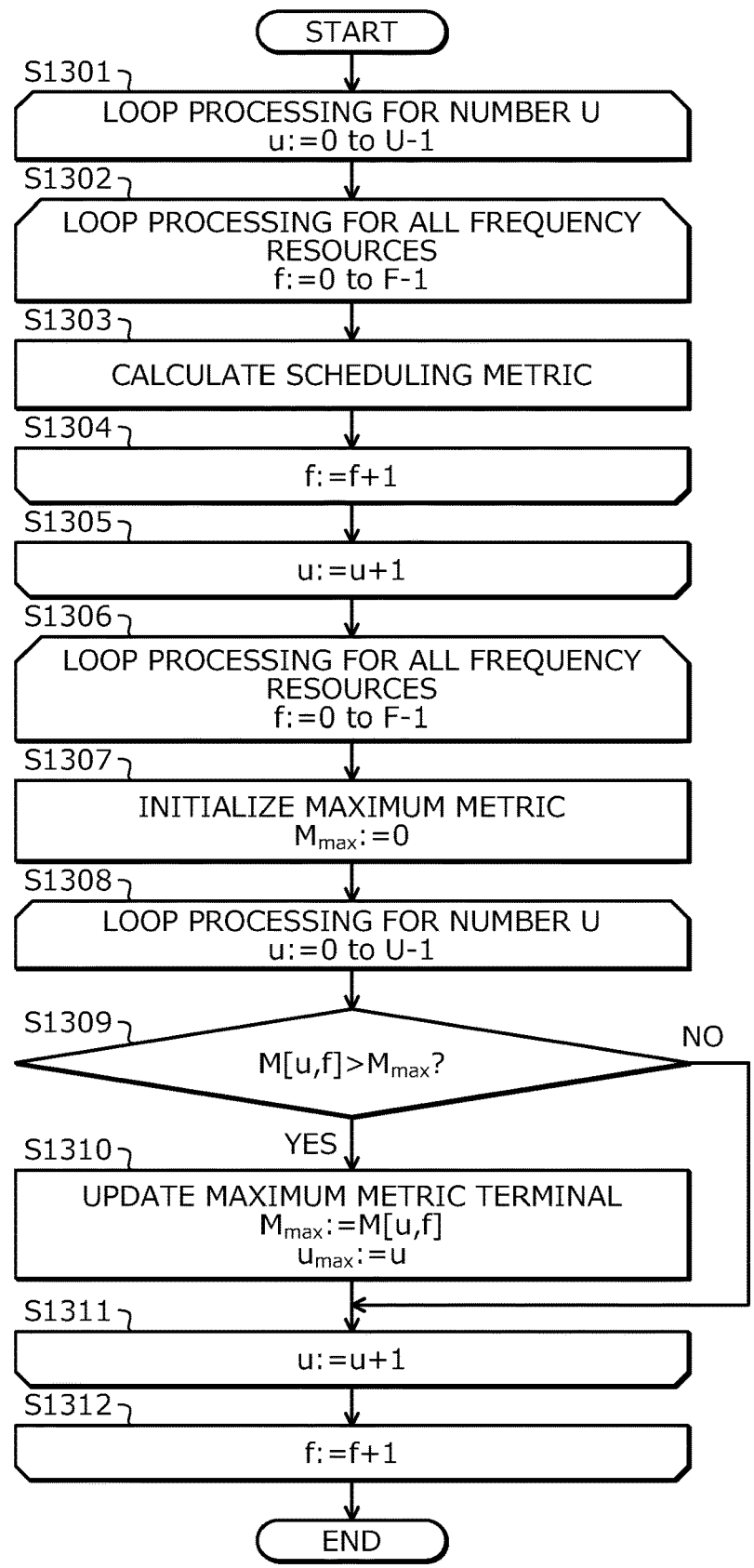
FIG. 13 is a flowchart (part 2) depicting details of the scheduling processing according to the first embodiment.

FIG. 13 is a flowchart depicting details of the scheduling processing according to the first embodiment. Depicted is an example of the scheduling metric calculation processing by the scheduling unit 212, depicted at step S1102 of FIG. 11. Although various methods are conceivable as wireless scheduling, the following description will be given of processing contents based on scheduling metric calculation of a proportional fair (PF) scheme.

In the PF scheme, as in the following formula (1), a value obtained by dividing a transmittable data rate of each terminal 110 to be scheduled by an average data rate of each terminal 110 is found as a scheduling metric. The scheduling metric is used as an index representative of the scheduling priority.

$$M_{u,f} = \frac{r_{u,f}}{R_u} \quad (1)$$

u: index of terminal to be scheduled
f: frequency resource number
$r_{u,f}$: instantaneous data rate of terminal u frequency resource f
$R_u$: average data rate of terminal u
$M_{u,f}$: scheduling metric of terminal u frequency resource f The transmittable data rate $r_{u,f}$ represents a transmittable data rate that is assumed from the wireless quality of the terminal 110. In the PF scheme, among terminals 110 having the same average rate, a terminal having a high instantaneous wireless quality and data rate is given a high scheduling priority (numerator). Among terminals 110 having the same wireless quality, a terminal 110 having a poor past communication opportunity is given a high scheduling priority (denominator). This PF scheme is a scheme performing scheduling that keeps balance between a terminal 110 with a high wireless quality and a terminal 110 with a low wireless quality.

In the processing example of FIG. 13, through the execution of each operation in FIG. 12, the scheduling unit 212 starts loop processing for the number U of terminals for the terminals 110 to be scheduled (step S1301). In this loop processing, operations at steps S1302 to S1304 are performed repeatedly until processing of all terminals 110 to be scheduled is completed.

At step S1302, the scheduling unit 212 starts loop processing for all frequency resources (step S1302). In this loop processing, processes at step S1303 are performed repeatedly until completion for the number of the frequency resources (the number F of all frequencies).

At step S1303, the scheduling unit 212 calculates the scheduling metric expressed by formula (1) above (step S1303).

Next, to perform the scheduling metric processing for the number of the frequency resources, the scheduling unit 212 increments f (step S1304) and continues the processing at step S1303 until reaching the number (f>F−1 at step S1302) of all the frequencies. Thereafter, at step S1305, the scheduling metric processing is performed for all the terminals 110 to be scheduled (step S1305). For this reason, the scheduling unit 212 increments u and continues the processing at steps S1302 to S1304 until reaching the number (u>U−1 at step S1301) of all the terminals to be scheduled. When u>U−1 at step S1301, it means that the scheduling metric processing of all the terminals to be scheduled is completed, allowing a shift to step S1306.

The scheduling unit 212 then uses the calculated scheduling metric, to determine one terminal 110 providing a maximum scheduling metric for each of the frequency resources, for example.

For the one terminal 110 determined, the transmission data size is determined taking into account all of the frequency resources allocated in preceding processes. The transmission data size is a data size that the base station 101 (scheduling unit 212) uses in scheduling correspondingly to the data size transmitted from the terminal 110.

At step S1206, the scheduling unit 212 starts loop processing for the number of all the frequency resources (step S1306). In this loop processing, operations at steps S1307 to S1311 are repeated until completion for the number (the number F of all frequencies) of the frequency resources.

Next, the scheduling unit 212 initializes a maximum metric $M_{max}$ (step S1307). The scheduling unit 212 starts loop processing for the number U of terminals to be processed (step S1308). In this loop processing, operations at steps S1309 and S1310 are repeated until the completion of the processes for all the target terminals 110.

At step S1309, the scheduling unit 212 determines whether the scheduling metric of the terminal 110 being processed is the maximum (step S1309). If not the maximum (step S1309: NO), the terminal to be processed is incremented in sequence (step S1311), and it is determined whether the scheduling metric is the maximum.

If the scheduling metric of the terminal 110 being processed is the maximum (step S1309: YES), the scheduling unit 212 performs an update that this terminal 110 being processed is the maximum metric terminal (step S1310). Then, the loop processing for the number U (u>U−1) of all the terminals and the loop processing for the number (f>F−1) of all the frequency resources are completed, one maximum metric terminal ($M_{max}$, $U_{max}$) having the maximum scheduling metric is determined, and the processing depicted in FIG. 13 comes to an end.

Figure 14:
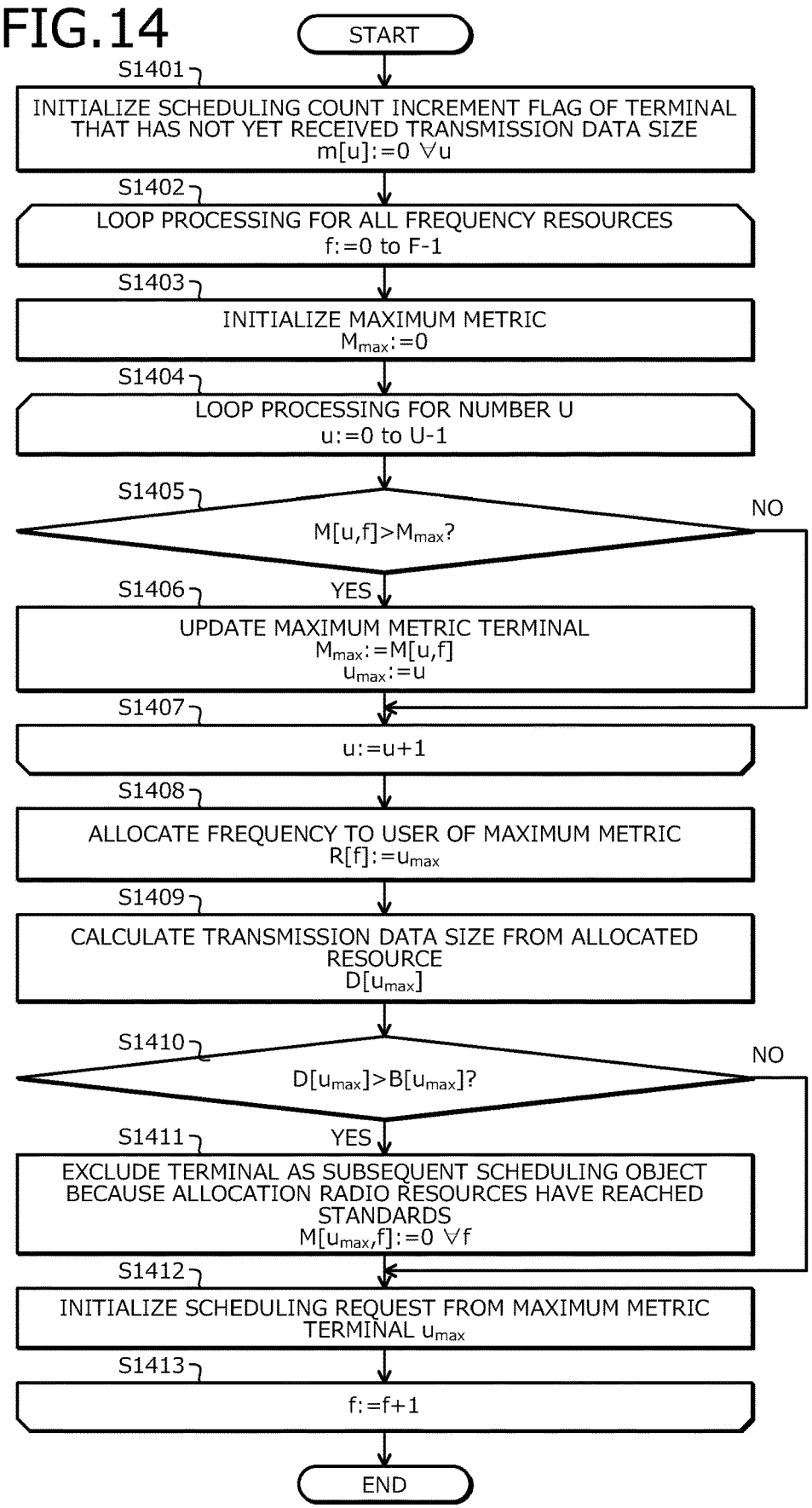
FIG. 14 is a flowchart (part 3) depicting details of the scheduling processing according to the first embodiment.

FIG. 14 is a flowchart depicting details of the scheduling processing according to the first embodiment. Depicted is an example of the processing of determining an allocation terminal by the scheduling unit 212, depicted at step S1103 of FIG. 11. At this time, one terminal 110 providing a maximum scheduling metric is determined for each frequency resource, for example.

Then, for the one terminal 110 determined, the transmission data size is determined taking into account all the frequency resources allocated in the preceding processes. The transmission data size is a data size that the base station 101 (scheduling unit 212) uses in scheduling correspondingly to the data size transmitted from the terminal 110.

If the determined transmission data size exceeds the buffer size (data size) of the terminal 110, it is determined that the scheduling for data to be transmitted from this terminal has been completely allocated, and this terminal is excluded as an object of scheduling for the corresponding timing. For example, regarding the terminal 110 excluded as an object of scheduling, the exclusion as an object of scheduling is carried out by setting the scheduling metric value to a possible minimum value.

At the beginning, the scheduling unit 212 initializes a scheduling count increment flag mu of a terminal 110 that has not yet received the transmission data size (step S1401). Thereafter, the scheduling unit 212 starts loop processing for the number of all frequency resources (step S1402). In this loop processing, operations at steps S1403 to S1412 are performed repeatedly until completion for the number of the frequency resources (the number F of all frequencies).

Next, the scheduling unit 212 initializes the maximum metric $M_{max}$ (step S1403). The scheduling unit 212 then starts loop processing for the number U of terminals to be processed (step S1404). In this loop processing, operations at steps 1405 and 1406 are repeated until completion of processing for all target terminals 110.

At step S1405, the scheduling unit 212 determines whether the scheduling metric of the terminal 110 being processed is the maximum (step S1405). If not the maximum (step S1405: NO), the number u of terminals to be processed is incremented in sequence (step S1407), and it is determined whether the scheduling metric is maximum.

When the scheduling metric of the terminal being processed is maximum (step S1405: YES), the scheduling unit 212 performs an update that this terminal 110 being processed is the maximum metric terminal (step S1406). When the loop processing for the number U of all terminals is completed, one maximum metric terminal ($M_{max}$, $u_{max}$) having the maximum scheduling metric is determined, allowing a shift to step S1408.

Next, the scheduling unit 212 allocates a frequency Rf (frequency resource) corresponding to the maximum metric to a user (terminal 110) of the maximum metric determined at step S1406 (step S1408). Subsequently, the scheduling unit 212 calculates a transmission data size $Du_{max}$ from the allocated resource (step S1409).

Next, the scheduling unit 212 determines whether the transmission data size $Du_{max}$ exceeds a buffer size (data size) $Bu_{max}$ of the terminal 110 (step S1410). When the transmission data size $Du_{max}$ exceeds the data size $Bu_{max}$ transmitted from the terminal 110 (step S1410: YES), this terminal 110 is excluded as a subsequent scheduling object because the allocation radio resources have reached the standards (step S1411). This corresponds to a state where scheduling for data to be transmitted is all allocated for the terminal 110. Thereafter, the procedure goes to step S1412.

On the other hand, when the transmission data size $Du_{max}$ does not exceed the data size $Bu_{max}$ transmitted from the terminal 110 (step S1410: NO), the scheduling unit 212 shifts to step S1412.

At step S1412, the scheduling unit 212 initializes a scheduling request from the maximum metric terminal $u_{max}$ (step S1412) and increments f (step S1413). The scheduling unit 212 then continues operations at steps S1403 to S1412 until reaching the number (f>F−1) of frequency resources. When f>F−1 is achieved at step S1402, it is means that allocation terminals for all the frequency resources have been determined, ending the processing depicted in FIG. 14.

Figure 15:
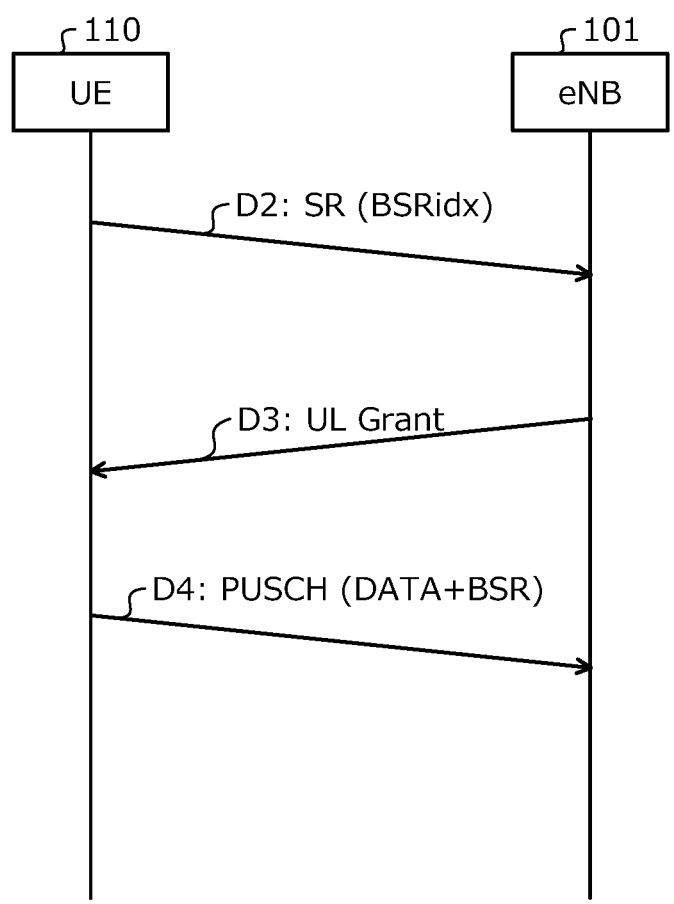
FIG. 15 is a sequence diagram (part 1) depicting data transmission between the terminal and the base station according to the first embodiment.
Figure 16:
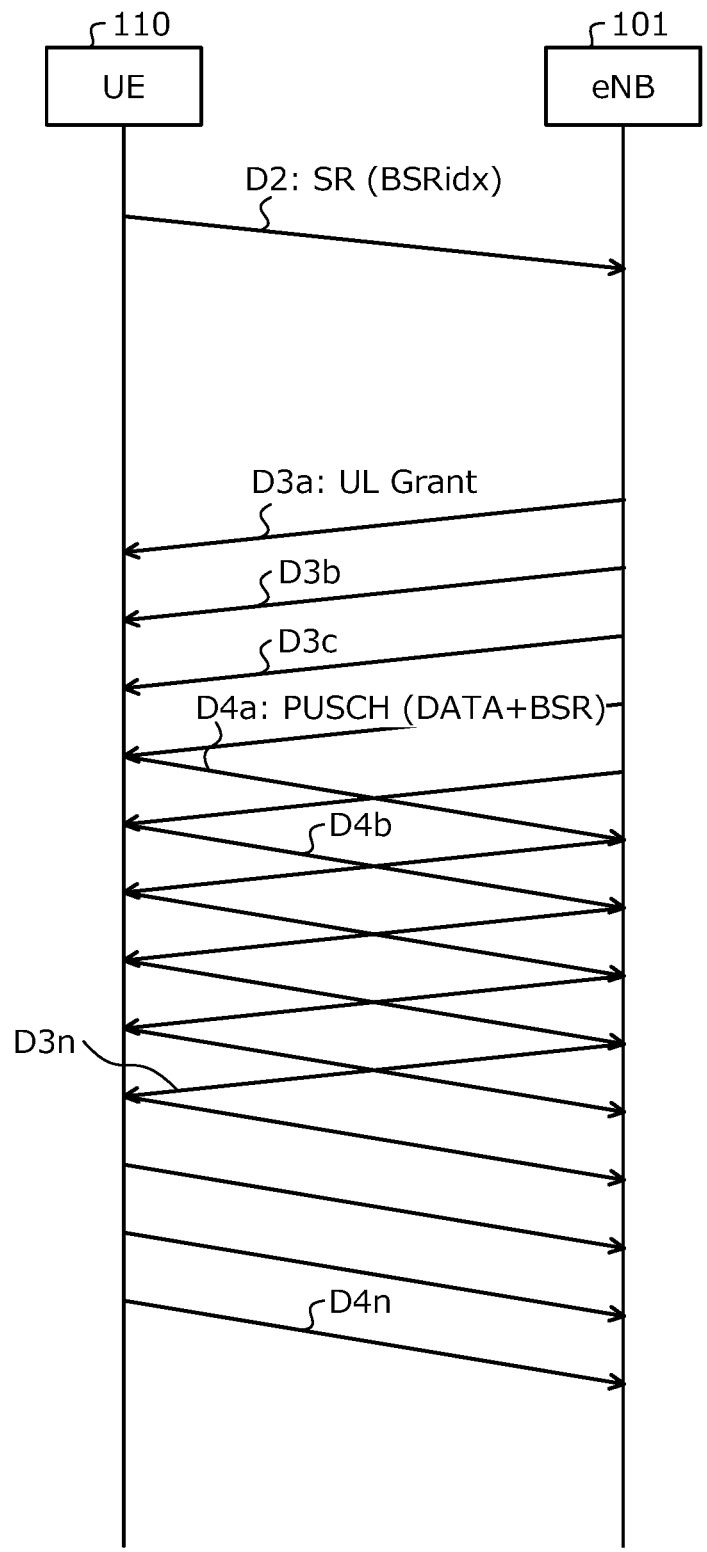
FIG. 16 is a sequence diagram (part 2) depicting data transmission between the terminal and the base station according to the first embodiment.

FIGS. 15 and 16 are sequence diagrams depicting data transmission between the terminal and the base station according to the first embodiment. Depicted is timing of data transmission by the above execution of scheduling.

FIG. 15 depicts an example of the scheduling when the data size transmitted from the terminal 110 is small. A terminal (UE) 110 transmits a scheduling request D2 to a base station (eNB) 101. At the time of this scheduling request D2, the terminal 110 notifies the base station 101 of the scheduling request D2 including (superimposed by) the data size of data to be transmitted to the base station 101.

The data size is a transmission data size stored in the transmission buffer of the terminal 110. The terminal 110 generates a buffer status index (BSRidx) of plural levels (0 to 3) corresponding to the transmission data size so that the terminal 110 may transmit to the base station 101, the buffer status index as a modulation symbol of a channel transmitting the scheduling request D2, thereby enabling a notification to the base station 101 by a small amount of data.

The base station 101 monitors radio resources with which the terminal 110 transmits a scheduling request and, when receiving a scheduling request D2 from the terminal 110, makes this terminal 110 an object of uplink communication scheduling.

The base station 101 then demodulates the scheduling request received from the terminal 110. At this time, the base station 101 performs symbol demodulation to restore the buffer status index and determines the data size transmitted from the terminal 110. Thus, the base station 101 determines the scheduling data size of the terminal 110.

The example of FIG. 15 depicts a case of the scheduling data size where, since the data size to be transmitted from the terminal 110 is small, a data transmission D4 from the terminal 110 is completed with a single scheduling D3.

FIG. 16 depicts an example of scheduling in the case where the data size transmitted from the terminal 110 is large. When the data size to be transmitted from the terminal 110 is large, the base station 101 determines the scheduling data size based on the data size transmitted from the terminal 110 and performs n-times of scheduling D3a to D3n. As a result, the terminal 110 performs n-times of data transmission D4a to D4n scheduled.

As described above, according to the first embodiment, the base station performs scheduling for the number of times that depends on the data size transmitted from the terminal. It is thus possible to prevent meaningless scheduling such as performing plural sessions of scheduling irrespective of the data size transmitted from the terminal; to improve the utilization efficiency of the radio resources; and to prevent the response delay to a scheduling request.

The first embodiment employs a configuration where a terminal 110 transmits the scheduling request D2 including (superimposed by), as the buffer status index, the data size transmitted from the terminal 110. In a second embodiment, the base station 101 identifies the buffer status index, based on the radio resources receiving the scheduling request D2.

FIG. 17 is a chart depicting a setting example of scheduling request radio resources by the terminal according to the second embodiment. Depicted is a setting example (settings table) 1700 of the radio resources of the scheduling request for the buffer status index. At the time of transmitting the scheduling request D2, the terminal 110 selects one of plural radio resources (A to D) transmitting the scheduling request D2, based on the buffer status indexes (0 to 1) of the settings table 1700. The terminal 110 then carries out the scheduling request D2 for the base station 101, using the selected radio resource.

The radio resources A to D are provided, for example, by the frequency band performing the scheduling request D2. For example, the radio resources A to D refer to the type for distinguishing each of plural users (terminals 110) multiplexed by code/series/frequency shift, etc. The terminal 110 makes the scheduling request D2, using the radio resources A to D corresponding to the data size (buffer status indexes 0 to 3) transmitted to the base station 101.

Figure 18:
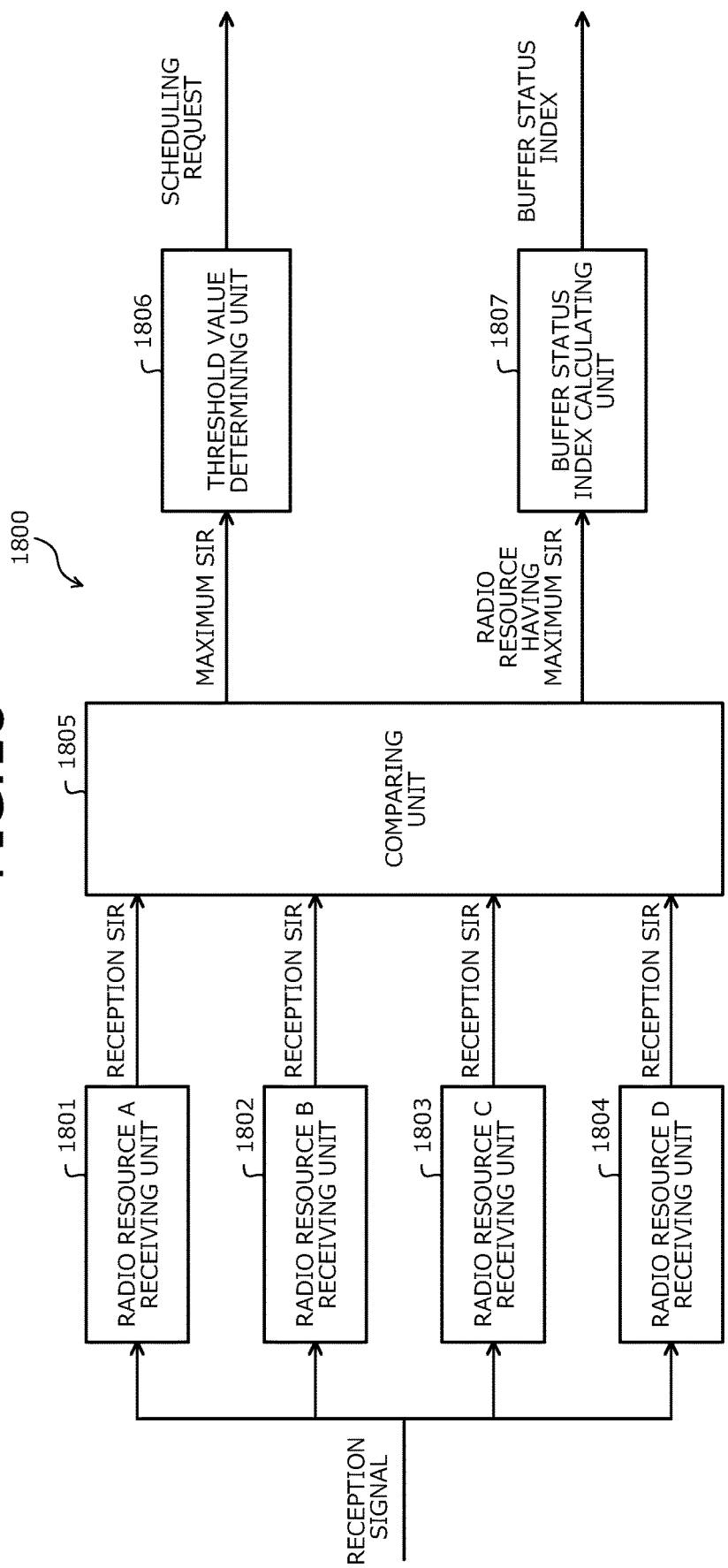
FIG. 18 is a diagram depicting a configuration example of a receiving unit of the base station according to the second embodiment.

FIG. 18 is a diagram depicting a configuration example of a receiving unit of the base station according to the second embodiment. A receiving unit 1800 is disposed in the baseband signal processing unit 213 (see FIG. 9). The receiving unit 1800 includes plural radio resource receiving units 1801 to 1804, a comparing unit 1805, a threshold value determining unit 1806, and a buffer status index calculating unit 1807.

A reception signal from the terminal 110 is branched to the radio resource receiving units 1801 to 1804, which in turn perform reception processing for all the radio resources A to D that the terminal 110 may transmit.

The comparing unit 1805 selects a radio resource having a maximum signal to interference ratio (SIR), among all the radio resources A to D subjected to reception processing at the radio resource receiving units 1801 to 1804. The threshold value determining unit 1806 determines the maximum SIR value using a predetermined threshold value, and outputs the presence or absence of the scheduling request D2. The buffer status index calculating unit 1807 calculates the buffer state index 0 to 3 corresponding to the type A to D of the maximum SIR radio resource. Based on the calculated buffer status index, the data size transmitted from the terminal 110 is determined.

Thus, the receiving unit 1800 can easily determine the data size of the terminal 110 that has issued the scheduling request D2, by merely determining the maximum SIR radio resource among the radio resources A to D. The receiving unit 1800 then notifies the scheduling unit 212 of the calculated buffer status index. The scheduling processing at the scheduling unit 212 is similar to that in the first embodiment.

According to the second embodiment, in the notification of the index value from the terminal to the base station, the radio resource of a channel transmitting the scheduling request may be changed depending on the data size. Thus, the terminal switches the radio resource to one suitable for the data size transmitted. The base station then monitors all the radio resources that may transmit the scheduling request so that, based on the received radio resource type, the base station may easily determine the data size to be transmitted by the terminal. The terminal may notify the base station of the data size, without transmitting information (buffer status index) corresponding to the data size to be transmitted.

In a third embodiment, a setting example will be described of the buffer status threshold value notified to the terminal 110 from the base station 101 utilizing broadcast information D1. In the third embodiment, the base station 101 notifies the terminal 110 of the buffer status threshold value in the form of an optimum value corresponding to traffic of the terminal 110. Accordingly, as for the buffer status threshold value set for each terminal 110, the base station 101 collects plural buffer sizes (data sizes) of the terminal 110 that have first been received after issuance of the scheduling request D2 from the terminal 110. The base station 101 then performs statistical processing of the collected data sizes, to thereby calculate an optimum threshold value for each terminal 110.

Figure 19:
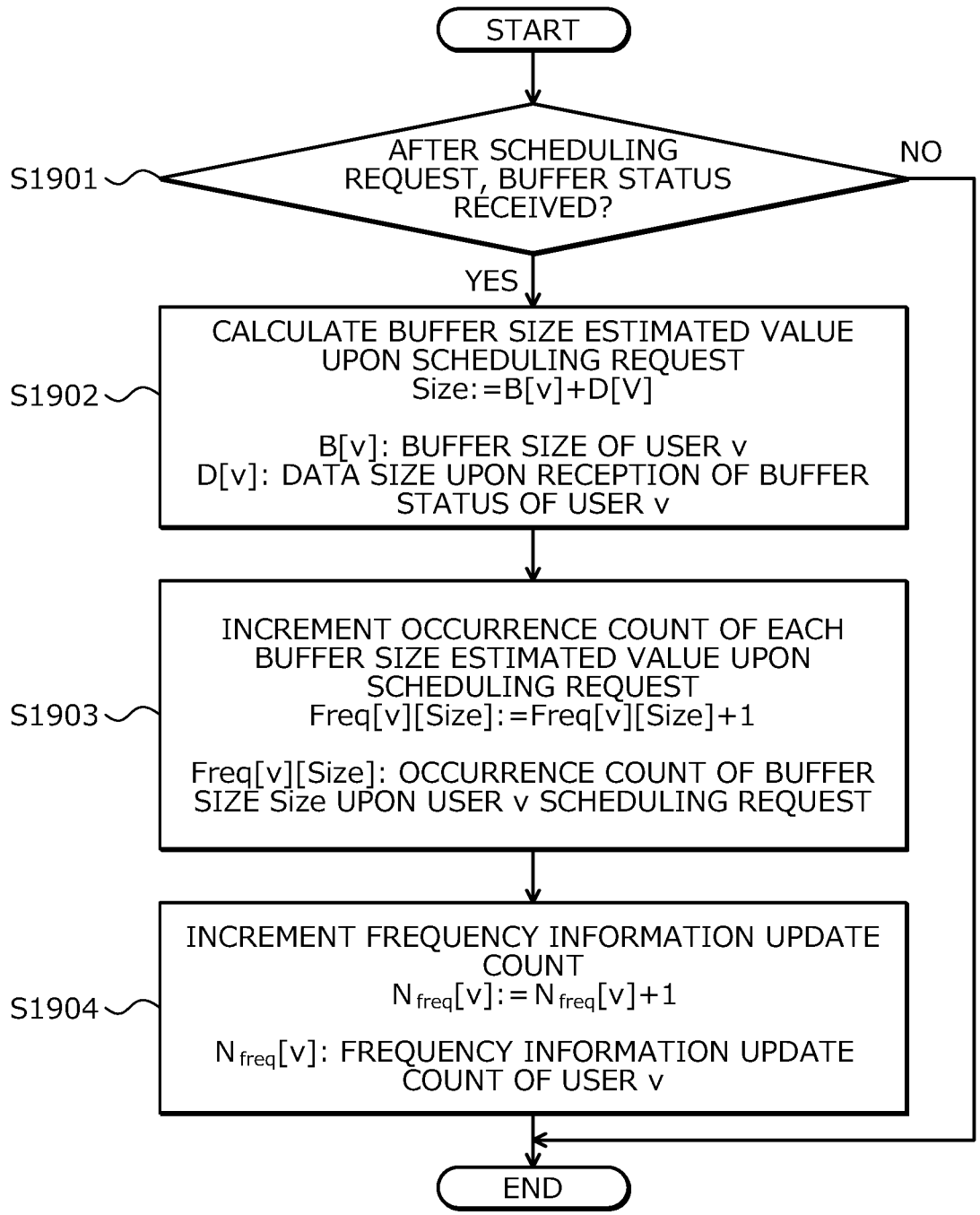
FIG. 19 is a flowchart depicting a processing example of estimation of a terminal data size by the base station according to a third embodiment.

FIG. 19 is a flowchart depicting a processing example of estimation of the terminal data size by the base station according to the third embodiment. After receiving a scheduling request D2 from the terminal 110, the scheduling unit 212 of the base station 101 performs a data transmission scheduling D3 of the terminal 110. The example of FIG. 19 is a processing example in which the scheduling unit 212 estimates the data size to be transmitted from the terminal 110 upon the scheduling request D2 and stores the statistical information of each estimated size (range).

After the scheduling request D2 from the terminal 110, the scheduling unit 212 determines whether the buffer status (data size) has been received from the terminal 110 (step S1901). If the reception of the buffer status (data size) from the terminal 110 is absent (step S1901: NO), the procedure terminates.

If the buffer status (data size) has been received from the terminal 110 (step S1901: YES), the scheduling unit 212 calculates the buffer size estimated value at the time of the scheduling request D2 (step S1902). The buffer size estimated value is obtained by adding together a size $B_v$ (v: user (terminal)) of the transmission buffer of the terminal 110 and a data size $D_v$ received from the user v.

The scheduling unit 212 then increments an occurrence count Freq of each buffer size estimated value upon the scheduling request D2 (step S1903). The scheduling unit 212 increments a frequency information update count $N_{freq}$ (step S1904), ending the processing. Consequently, after the scheduling request D2 from the terminal 110, the scheduling unit 212 records the occurrence count of each data size, based on the buffer size notified from the terminal 110.

Figure 20:
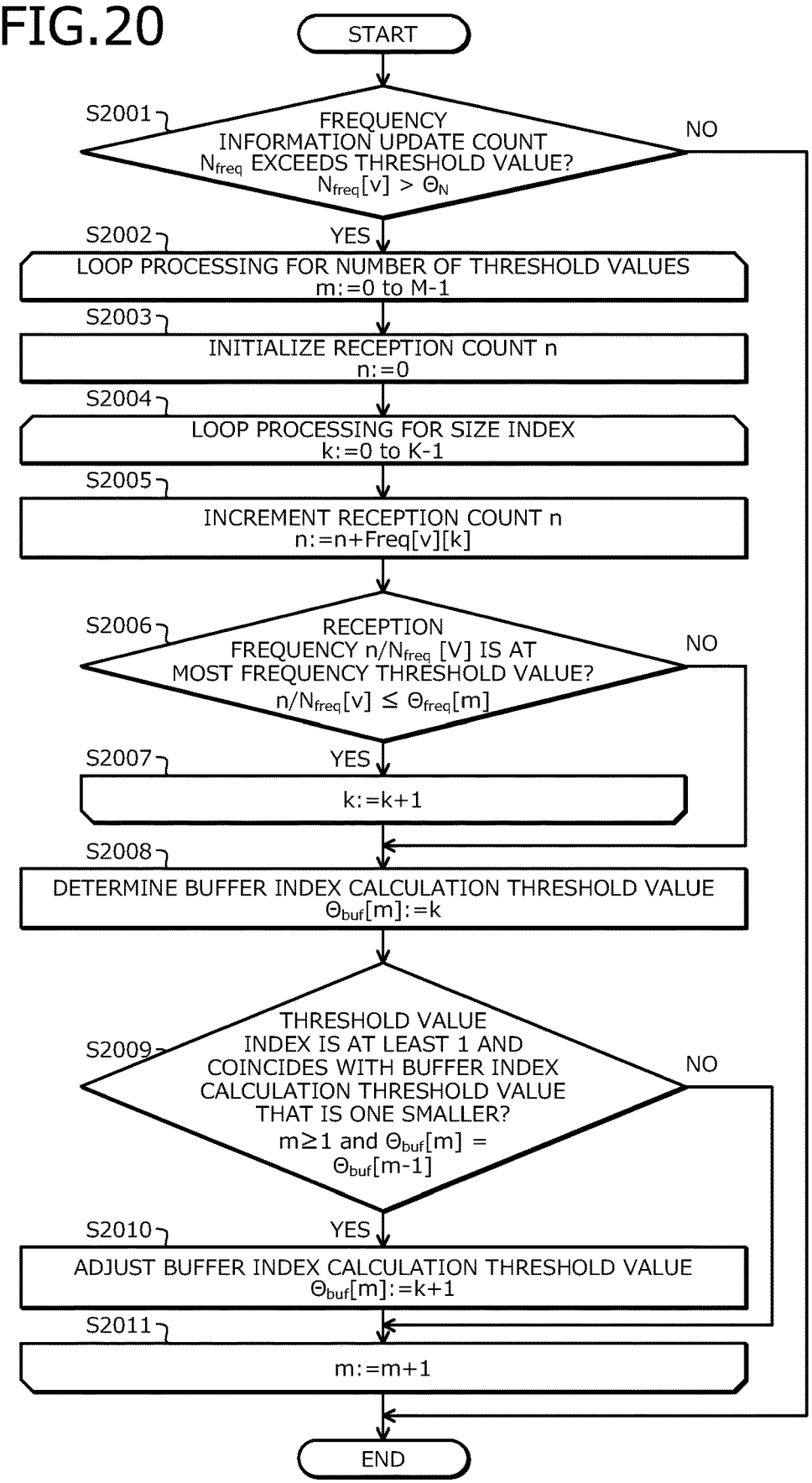
FIG. 20 is a flowchart depicting an example of buffer status threshold value calculation processing by the base station according to the third embodiment.

FIG. 20 is a flowchart depicting an example of buffer status threshold value calculation processing by the base station according to the third embodiment. After execution of record processing depicted in FIG. 19 by a certain number of times, the scheduling unit 212 performs processing of FIG. 20.

First, the scheduling unit 212 determines whether the frequency information update count $N_{freq}$ exceeds a predetermined threshold value $\theta_N$ (step S2001). When the result of the determination is negative (step S2001: NO), the procedure ends. When the frequency information update count $N_{freq}$ exceeds the predetermined threshold value $\theta_N$ (step S2001: YES), the scheduling unit 212 starts loop processing for a threshold value number m (the number of threshold values) set as the buffer status threshold values (step S2002).

Next, the scheduling unit 212 initializes a reception count n (step S2003), and starts loop processing for size index k (step S2004). The scheduling unit 212 then increments the frequency information update count $N_{freq}$ as the reception count n (step S2005). With v: user, k: number of size indexes for data size, the scheduling unit 212 calculates the reception count n (reception count of the buffer size notified from the terminal 110) by the user and by the data size.

Next, the scheduling unit 212 determines whether a reception frequency $n/N_{freq}$ is at most a predetermined frequency threshold value $\theta_{freq}$ (step S2006). With m:threshold value number, the frequency threshold value $\theta_{freq}$ corresponds to the threshold value number. When, as a result of the determination, the reception frequency $n/N_{freq}$ is not equal to or less than the predetermined frequency threshold value $\theta_{freq}$ (step S2006: NO), the procedure goes to step S2008. On the other hand, when the reception frequency $n/N_{freq}$ is equal to or less than a predetermined frequency threshold value $\theta_{freq}$ (step S2006: YES), the scheduling unit 212 increments the size index k (step S2007) and continues the processing at step S2005. If the loop processing has been completed for the size index k, the procedure goes to step S2008.

Next, the scheduling unit 212 determines the size index k as a buffer index calculation threshold value $\theta_{buf}$ (step S2008). Thereafter, the scheduling unit 212 determines whether a threshold value index m is at least 1 and coincides with a buffer index calculation threshold value $\theta_{buf}$ that is one smaller (step S2009). When the determination result is affirmative (step S2009: YES), the scheduling unit 212 adjusts the buffer index calculation threshold value $\theta_{buf}$ as a size index k+1 (step S2010) and shifts to step S2011. On the other hand, when the determination result is negative (step S2009: NO), the procedure geos to step S2011.

Subsequently, at step S2011, the scheduling unit 212 continues processing at steps S2003 to S2010 until the completion of loop processing for the threshold value number m (step S2011). When the loop processing is completed for the threshold value number m, the above processing is brought to an end.

As described above, in the third embodiment, the reception count is recorded for each reception of the data size of transmission data after the scheduling request from the terminal. Then, the reception frequency is obtained from the reception count, and a data size whose reception frequency exceeds a predefined threshold value is determined as a threshold value (buffer status threshold value) for buffer index calculation. Plural buffer status threshold values may be defined, based on the data size of transmission data differing for each terminal. As a result, the buffer status threshold value notified to the terminal as the broadcast information from the base station may be a value suitable for the terminal traffic, enabling the base station to effectively perform scheduling for each terminal.

Figure 21:
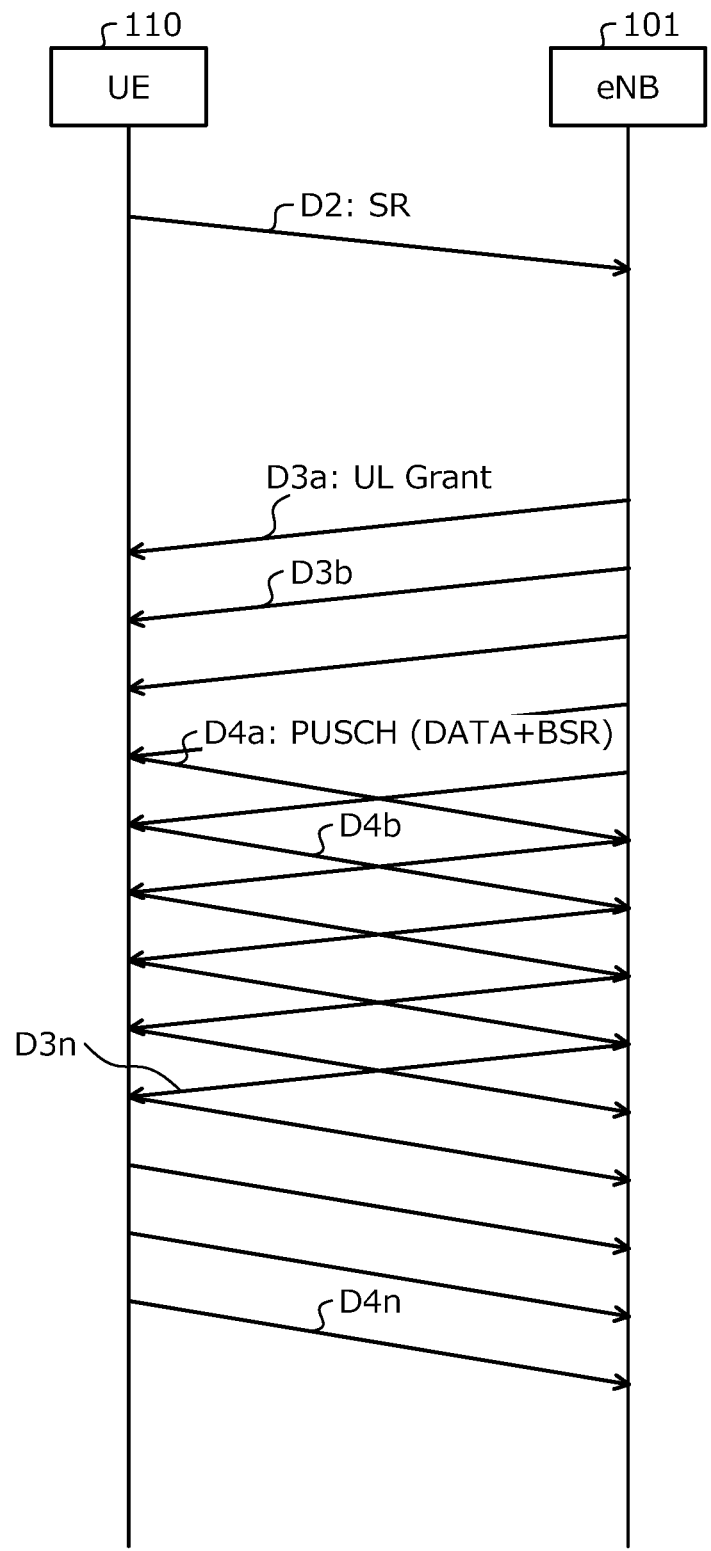
FIG. 21 is a sequence diagram depicting a scheduling procedure by existing technology.

FIG. 21 is a sequence diagram depicting a scheduling procedure by existing technology. With reference to FIG. 21, the scheduling procedure by the existing technology will be described.
1. A terminal transmits a scheduling request SR to a base station (D2).
2. The base station monitors radio resources with which the terminal transmits the scheduling request. When verifying a reception of the scheduling request, the base station makes the corresponding terminal an object of uplink communication scheduling. As a result of the uplink communication scheduling, the base station notifies the terminal of a radio resource for performing the uplink communication, etc. (D3).

This scheduling technique, however, cannot take account of the data size to be transmitted from the terminal, in scheduling carried out at the base station. For this reason, in the case of a small amount of data whose communication is completed by a single transmission, for example, the remaining allocation becomes futile thoroughly. In this case, as depicted in FIG. 21, plural sessions of scheduling D3a to D3n are allocated irrespective of the data size transmitted from the terminal, resulting in a useless allocation. During this useless allocation (e.g., D3b to D3n), other terminals cannot receive the resource allocation. The terminal may transmit effective data only once of D4a, for example, among the data transmissions D4a to D4n allocated correspondingly to the plural sessions of scheduling D3a to D3n.

Figure 22:
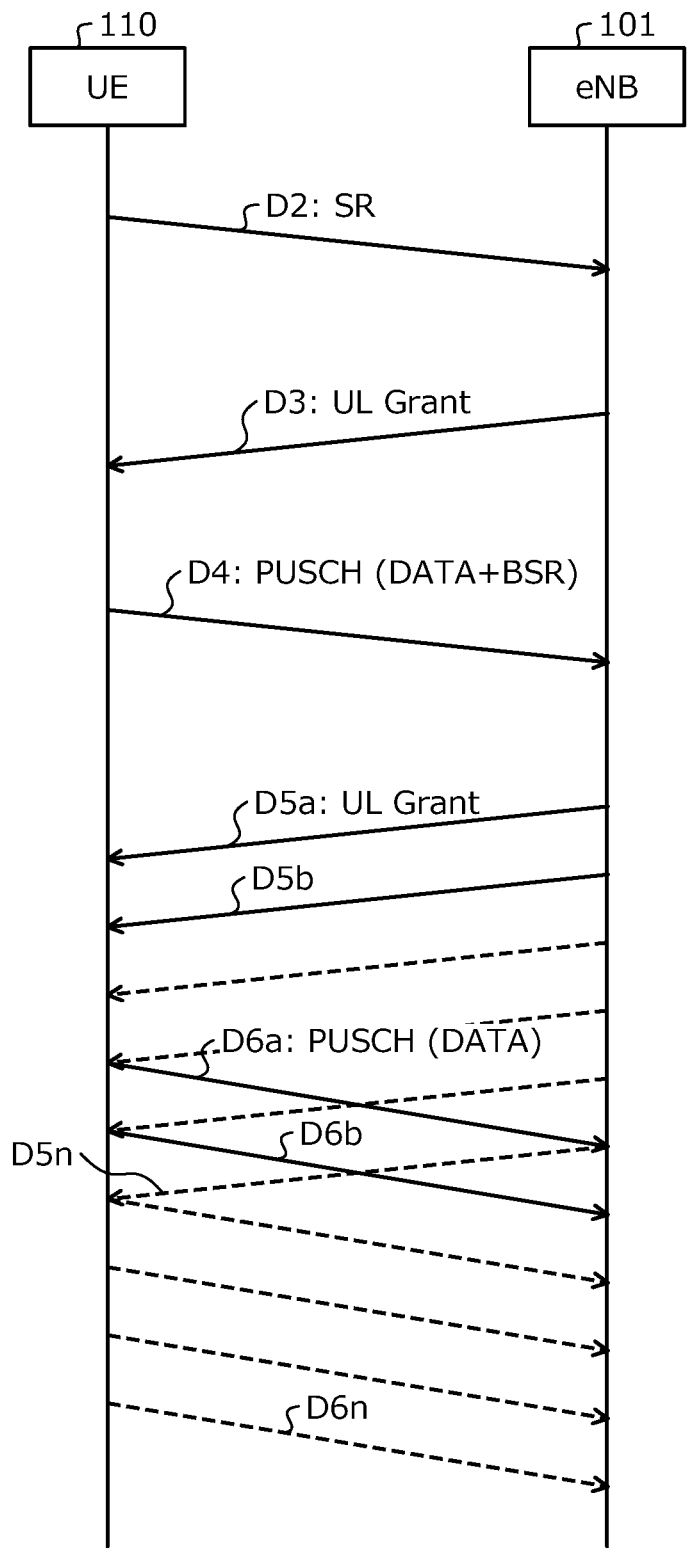
FIG. 22 is a sequence diagram depicting another example of the scheduling procedure by an existing technology.

FIG. 22 is a sequence diagram depicting another example of the scheduling procedure by an existing technology. Another existing technique for preventing the occurrence of futile allocation as depicted in FIG. 21 will be described. In the scheduling technique depicted in FIG. 22,
1. A terminal transmits a scheduling request SR to a base station (D2).
2. The base station monitors radio resources with which the terminal transmits the scheduling request. When verifying a reception of the scheduling request, the base station makes the corresponding terminal an object of uplink communication scheduling. As a result of the uplink communication scheduling, the base station notifies the terminal of a radio resource for performing the uplink communication, etc. (D3).
3. When receiving the radio resource notification from the base station, the terminal transmits uplink data (D4). At the same time, the remaining size of transmission data occurring at the terminal is notified.
4. The base station verifies the transmission data size occurring at the terminal transmitted from the terminal and carries out scheduling by plural sessions corresponding to the data size (D5a to D5n).

In this scheduling technique, a time slightly less than 20 ms is required until the actual start of data transmission (D6a to D6n) after transmission of the scheduling request D2 from the terminal. The reason for such time consumption is that when uplink communication is not performed until just before, a base station carrying out scheduling cannot know the size of data occurring at a terminal. Thus, in order not to waste the radio resources, the base station cannot positively perform radio resource allocation corresponding to the data size until the reception of notification (D4) of the data size from the terminal.

In this manner, in the existing technology, as depicted in FIG. 21, meaningless allocation of radio resources occurs. Furthermore, as depicted in FIG. 22, there occurs a response delay to a scheduling request. In the transmission data pattern occurring at a terminal, such small-sized data (TCP ACK, etc.) occurs very often. This results in a meaningless consumption of finite radio resources and hinders reductions in the power consumption of the terminal. Under such circumstances, small-sized data (TCP ACK, etc.) occurs extremely often as the pattern of transmission data to the base station occurring at the terminal, conventionally making it difficult to perform effective scheduling according to the status (transmission data size, etc.) of the terminal.

On the contrary, according to the embodiments set forth hereinabove, the terminal transmits to the base station, a scheduling request including the data size to be transmitted. This allows the base station to perform scheduling taking account the size of data transmitted from the terminal. By virtue of this, in the case of small data whose communication is completed, for example, by a single transmission from the terminal, scheduling for the time corresponding to this data size is allocated so that the meaningless allocation of scheduling may be prevented to improve the utilization efficiency of the radio resources.

Thus, according to the embodiments, it becomes possible to prevent the resource depletion caused by meaningless allocation of uplink communication resources; to promptly allocate the uplink communication resources; and to reduce the response delay to a scheduling request.

Furthermore, useless transmission/reception of data channels may be suppressed between the base station and terminal, achieving a reduction in the power consumption of the terminal. For example, even if the terminal undergoes very frequent occurrence of small-sized data such as TCP ACK, scheduling (number of times) may be set corresponding to the data size actually transmitted from the terminal.

According to one embodiment, it is possible to prevent resource depletion caused by meaningless allocation of uplink communication resources and to promptly allocate the uplink communication resources.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a terminal; and
a base station configured to perform uplink scheduling, wherein
the terminal transmits to the base station, a signal that includes a scheduling request and a buffer state index value of the terminal, wherein the signal is transmitted using a radio resource type predefined according to a type of the buffer state index value, and
the base station performs scheduling for the terminal, based on the buffer state index value, wherein the buffer state index value corresponds with the radio resource type by which the scheduling request is received.

2. The wireless communication system according to claim 1, wherein
the buffer state index value is any one of index values corresponding to a data size of data stored in a transmission buffer, according to a plurality of buffer status threshold values of the terminal.

3. The wireless communication system according to claim 2, wherein
the base station notifies the terminal of the buffer status threshold values in advance.

4. The wireless communication system according to claim 2, wherein
the base station notifies the terminal of the buffer status threshold values upon communication connection with the terminal.

5. The wireless communication system according to claim 2, wherein
the terminal retains, in advance, the buffer status threshold values in a memory in an updatable manner.

6. The wireless communication system according to claim 2, wherein
the base station collects a data size transmitted from the terminal, calculates the buffer status threshold value corresponding to traffic of each terminal, and notifies the terminal of the buffer status threshold value.

7. A base station comprising:
a receiver configured to receive from a terminal, a signal that includes a scheduling request and a buffer state index value of the terminal, wherein the signal is transmitted by the terminal using a radio resource type predefined according to a type of the buffer state index value;
a memory; and
a processor coupled to the memory, the processor configured to schedule the terminal based on the buffer state index value, wherein the buffer state index value corresponds with the radio resource type by which the scheduling request is received.

8. The base station according to claim 7, wherein
the buffer state index value is any one of index values corresponding to a data size of data stored in a transmission buffer, according to a plurality of buffer status threshold values of the terminal.

9. A terminal comprising:
a transmitter configured to transmit to a base station, a signal that includes a scheduling request and a buffer state index value, wherein the signal is transmitted using a radio resource type predefined according to a type of the buffer state index value; and
a receiver configured to receive a signal that includes information indicating resource allocation by the base station according to the buffer state index value, wherein the buffer state index value corresponds with the radio resource type by which the scheduling request is received by the base station, wherein
the transmitter transmits to the base station, a data volume according to the information indicating the resource allocation.

10. The terminal according to claim 9, wherein
the buffer state index value is any one of index values corresponding to a data size of data stored in a transmission buffer, according to a plurality of buffer status threshold values of the terminal.

* * * * *